US005969883A

United States Patent [19]

Yamakawa et al.

[11] Patent Number: 5,969,883

[45] Date of Patent: Oct. 19, 1999

[54] IMAGING LENS AND OPTICAL APPARATUS USING THE SAME

[75] Inventors: Hiromitsu Yamakawa; Akira Yabe, both of Omiya, Japan

[73] Assignee: Fuji Photo Optical Co., Ltd., Saitama, Japan

[21] Appl. No.: 09/247,938

[22] Filed: Feb. 11, 1999

[30] Foreign Application Priority Data

Feb. 27, 1998 [JP] Japan ................................ 10-064422

[51] Int. Cl.$^{6}$ ................................ G02B 9/34; G02B 3/06

[52] U.S. Cl. ........................... 359/779; 359/740; 359/715

[58] Field of Search .................................... 359/779, 715, 359/740

[56] References Cited

U.S. PATENT DOCUMENTS

| | | | |
|---|---|---|---|
| 2,767,614 | 10/1956 | Altman | 359/779 |
| 3,200,703 | 8/1965 | Müller et al. | 359/779 |
| 3,390,936 | 7/1968 | Price | 359/779 |
| 5,731,915 | 3/1998 | Noda | 359/779 |
| 5,739,966 | 4/1998 | Tanaka | 359/779 |

FOREIGN PATENT DOCUMENTS

| | | |
|---|---|---|
| 59-90810 | 5/1984 | Japan . |
| 07104185 | 4/1995 | Japan . |
| 09127414 | 5/1997 | Japan . |

*Primary Examiner*—Georgia Epps
*Assistant Examiner*—Evelyn A. Lester
*Attorney, Agent, or Firm*—Snider & Chao LLP; Ronald R. Snider

[57] ABSTRACT

In an imaging lens suitable for image reading of a four-lens element configuration comprising, successively from the object side, positive, positive, negative, and positive lenses, at least one surface of the fourth lens is made aspherical, whereby lighter weight and lower cost are achieved, while various kinds of aberration are corrected. The four-lens element imaging lens comprises, successively from the object side, positive first and second lenses $L_1$ and $L_2$ each having a surface on the object side convex toward the object side, a negative third lens $L_3$ having a surface on the image side concave toward the image side, and a positive fourth lens $L_4$ having at least one aspheric surface.

8 Claims, 6 Drawing Sheets

EXAMPLE 1

EXAMPLE 1

EXAMPLE 1

EXAMPLE 1

COMA (mm)

EXAMPLE 2

EXAMPLE 2

EXAMPLE 2

EXAMPLE 2

COMA(mm)

IMAGING LENS AND OPTICAL APPARATUS USING THE SAME

RELATED APPLICATIONS

This application claims the priority of Japanese Patent Application No. 10-64422 filed on Feb. 27, 1998, which is incorporated herein by reference.

BACKGROUND OF THE INVENTION

1. Field of the Invention

The present invention relates to an imaging lens for image reading used in an optical system of image-reading apparatus such as facsimile machine, copying apparatus, and image scanner; and an image-reading apparatus using the same. In particular, it relates to an image-reading imaging lens used for reducing or enlarging images, and an optical apparatus using the same.

2. Description of the Prior Art

It is basically required for an image-reading imaging lens used for a facsimile machine, copying apparatus, image scanner, or the like of a type which forms a reduced or enlarged original image on an imaging device such as CCD to have high resolution, large marginal light quantity, and low distortion at the imaging magnification used. As those satisfying these requirements, there have been provided Gaussian type lenses of a six-lens element configuration (e.g., the one disclosed in Japanese Unexamined Patent Publication No. 59-90810) and Xenotar type lenses of a five-lens element configuration (e.g., the one disclosed in Japanese Unexamined Patent Publication No. 9-127414).

In addition to these requirements, there have recently been demands for reducing the weight of lens systems and accordingly the weight of the optical apparatus as a whole, and cutting down the manufacturing cost.

Known as an imaging lens which can respond to such demands is the one disclosed in commonly-assigned Japanese Unexamined Patent Publication No. 7-104185 in which the number of lens elements is reduced to 4.

Though image surface curvature and distortion are corrected well in the imaging lens of a four-lens element configuration disclosed in the above-mentioned Japanese Unexamined Patent Publication No. 7-104185, its spherical aberration is somewhat large. As a consequence, though it has a sufficient resolution as an imaging lens used for an image-reading apparatus having a relatively low number of resolution lines (about 400 dpi or less on the original side), its resolution may be insufficient as an imaging lens used for an image-reading apparatus having a higher number of resolution lines (about 600 dpi or higher on the original side).

SUMMARY OF THE INVENTION

In view of such circumstances, it is an object of the present invention to provide a light-weight, inexpensive imaging lens for image reading, which is constituted by four lens elements and forms images of high quality, and an optical apparatus using the same.

The imaging lens of the present invention comprises, successively from an object side, positive first and second lenses each having a surface on the object side convex toward the object side, a negative third lens having a surface on an image side concave toward the image side, and a positive fourth lens having at least one aspheric surface.

A stop may be disposed between the third and fourth lenses.

Preferably, the imaging lens is configured such as to satisfy the following conditional expressions (1) and (2):

(1) $f_{123}>f$ (2) $f>f_4$ where f is the composite focal length of the whole lens system near the optical axis thereof;

$f_{123}$ is the composite focal length of the first, second, and third lenses; and $f_4$ is the focal length of the fourth lens near the optical axis thereof.

The optical apparatus of the present invention employs the above-mentioned imaging lens.

While the imaging lens of the present invention can be used as an image-reducing lens when the first to fourth lenses are successively disposed from the object side as mentioned above, it can also be used as an image-enlarging lens when the first to fourth lenses are successively disposed from the imaging surface side as the whole lens system is reversed as it is.

DESCRIPTION OF THE PREFERRED EMBODIMENTS

In the following, embodiments of the present invention will be explained with reference to the accompanying drawings.

Figure 1:
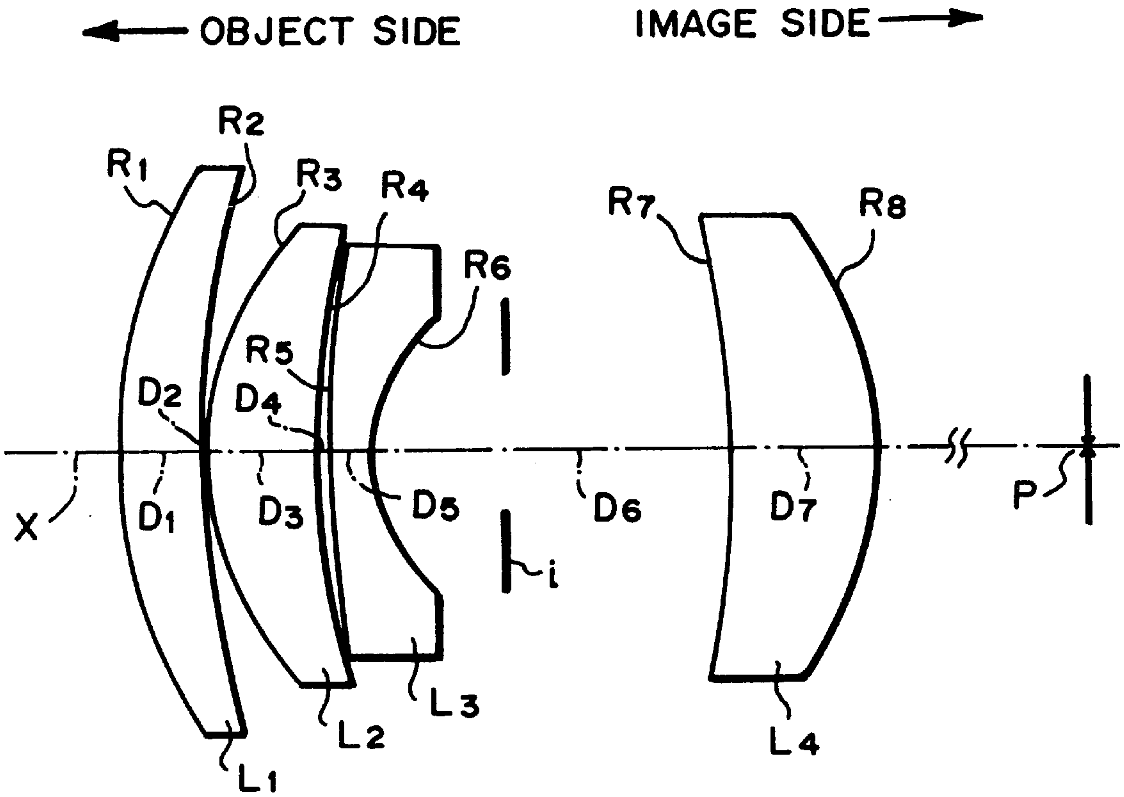
FIG. 1 is a schematic view showing a basic configuration of imaging lens in accordance with Examples 1 and 2 of the present invention.
Figure 2:
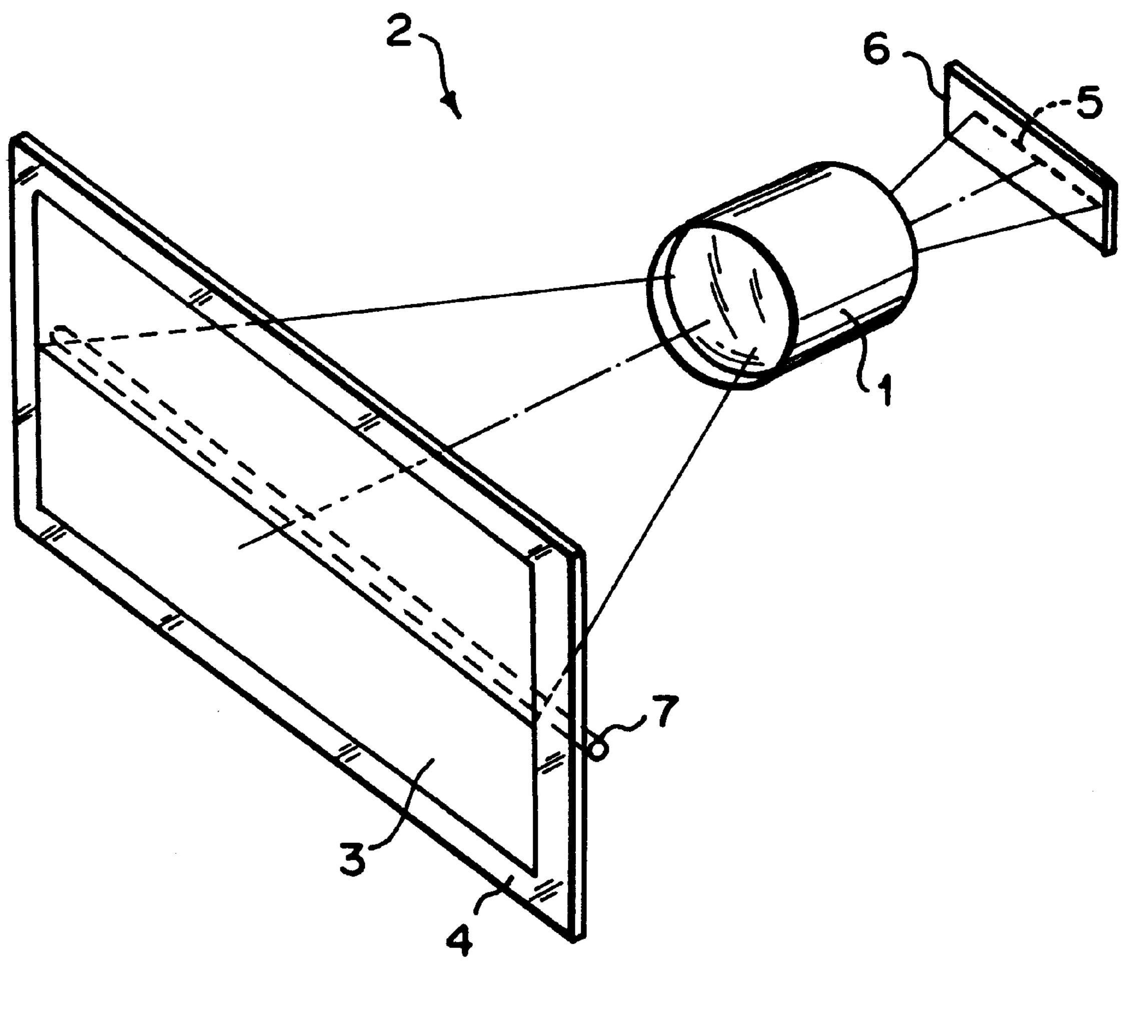
FIG. 2 is a schematic configurational view showing an image-reading apparatus using the imaging lens shown in FIG. 1.
Figure 3C:
FIGS. 3A, 3B and 3C are aberration charts (for spherical aberration, astigmatism, and distortion) of the imaging lens in accordance with Example 1.
Figure 3B:
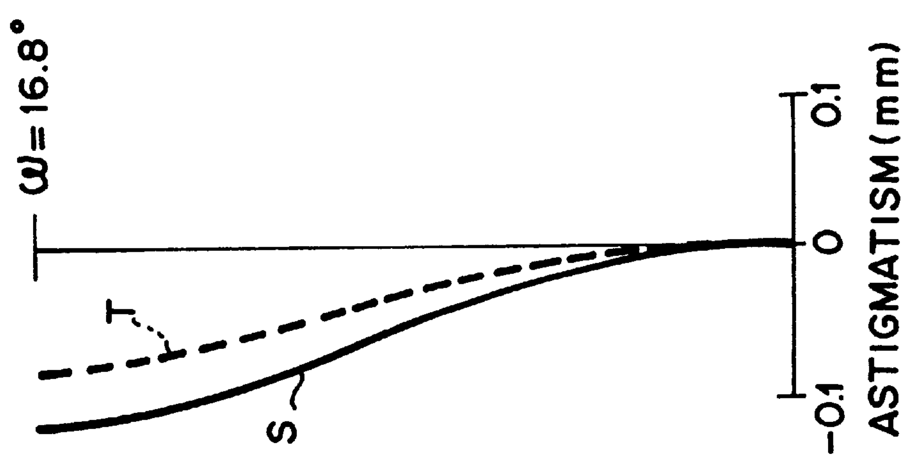
Figure 3A:
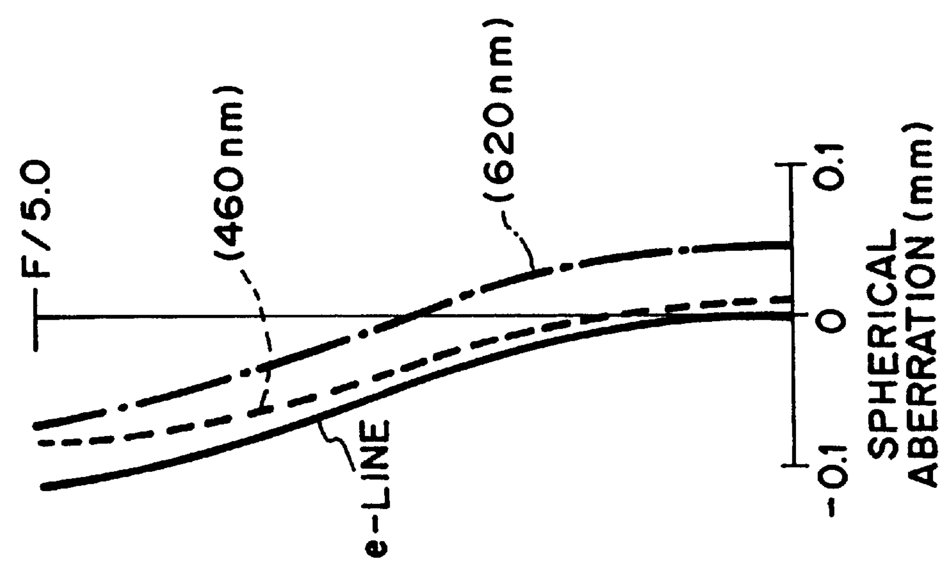

Here, FIG. 1 shows a basic lens configuration of Examples 1 and 2, whereas FIG. 2 shows a schematic configuration of an image-reading apparatus using the imaging lens shown in FIG. 1 as its image-reading lens.

As shown in FIG. 2, an imaging lens 1 for image reading in accordance with the present invention is used for an optical system of an image-reading apparatus 2 such as facsimile machine, copying apparatus, image scanner, or the like. In this image-reading apparatus 2, the imaging lens 1 is disposed between a glass plate 4 for mounting an original 3 and a cover glass 6 of a linear CCD 5, whereas an illumination device 7 is placed on the imaging lens side of the glass plate 4.

In the image-reading apparatus 2, when the illumination device 7 projects light onto the original 3, a luminous flux reflected by the original 3 forms an image with the aid of the imaging lens 1, and thus formed image is read out by the linear CCD 5.

As shown in FIG. 1, each imaging lens for image reading in accordance with Examples 1 and 2 is constituted by four lenses $L_1$ to $L_4$, whereas a stop i is disposed between the third lens $L_3$ and the fourth lens $L_4$. The luminous flux incident on the imaging lens along its optical axis X forms an image at an imaging position P.

Successively from the object side, each of the first lens $L_1$, and second lens $L_2$ is a convex meniscus lens having a convex surface directed onto the object side, the third lens $L_3$ is a concave meniscus lens having a convex surface directed onto the object side, and the fourth lens $L_4$ is a convex meniscus lens, whose both sides are aspheric, having a convex surface directed onto the imaging surface side. The aspheric surface form is represented by the following aspherical expression:

$$Z = \frac{C \cdot H^2}{1 + \sqrt{1 - K \cdot C^2 \cdot H^2}} + A_4H^4 + A_6H^6 + A_8H^8 + A_{10}H^{10} \quad \text{(Expression 1)}$$

where

- Z is the length (mm) of a normal from a point on an aspheric surface having a height H from the optical axis to the tangent plane (plane perpendicular to the optical axis) of the aspherical surface apex;
- C is the paraxial curvature of the aspheric surface;
- H is the height (mm) from the optical axis; and
- $A_4$, $A_6$, $A_8$, and $A_{10}$ are respective aspherical coefficients of the fourth, sixth, eighth, and tenth orders.

Since the fourth lens $L_4$ is made aspherical, the number of lens elements required for aberration correction can be reduced, thereby cutting down the weight and cost of the lens system as a whole.

Also, when the stop i is disposed between the third lens $L_3$ and the fourth lens $L_4$, various kinds of aberration can favorably be corrected in a well-balanced manner in a reducing or enlarging lens.

Further, these lenses satisfy the following conditional expressions (1) and (2):

(1) $f_{123}>f$ (2) $f>f_4$ where

- f is the composite focal length of the whole lens system near the optical axis thereof;
- $f_{123}$ is the composite focal length of the first lens $L_1$, second lens $L_2$, and third lens $L_3$; and
- $f_4$ is the focal length of the fourth lens $L_4$ near the optical axis thereof.

When conditional expressions (1) and (2) are satisfied, spherical aberration, astigmatism, coma, and distortion are favorably corrected.

Outside the range of conditional expression (1), astigmatism would increase when spherical aberration and distortion are to be kept favorably. Outside the range of conditional expression (2), coma would deteriorate when distortion is to be made smaller. As a consequence, performances necessary as an image-reading lens, i.e., a homogenous image throughout the screen area, may not be obtained outside the ranges of conditional expressions (1) and (2).

In the following, Examples 1 and 2 will be explained with reference to specific values.

The imaging lenses in accordance with Examples 1 and 2 are normalized at a focal length of 100 mm, and can be used with their focal lengths determined for dimensions of each original as each Example is proportionally reduced or enlarged in conformity to the dimensions of the original to be read out as required.

EXAMPLE 1

The following Table 1 shows the radius of curvature R (mm) of each lens surface, center thickness of each lens and air gap between neighboring lenses D (mm), and refractive index $N_e$ and Abbe number $\nu_e$ of each lens at e-line in Example 1.

In Table 1 and Table 4 which will be mentioned later, the numbers referring to each of the symbols R, D, $N_e$, and $\nu_e$ successively increase from the object side.

In Table 1 and Table 4 which will be mentioned later, the surfaces in which "*" is added to the right side of their surface numbers are aspheric surfaces, whereas the radius of curvature R of each aspherical surface refers to the value of the radius of curvature near the optical axis.

Table 2 shows the values of individual constants C, K, $A_4$, $A_6$, $A_8$, and $A_{10}$ of the aspherical surfaces represented by the above-mentioned aspherical expression in Example 1.

Table 3 shows the values of focal length f, F number, imaging magnification β, and half angle of view ω of the whole lens system and values corresponding to the above-mentioned conditional expressions (1) and (2) in the imaging lens of Example 1.

As can be seen from Table 3, Example 1 satisfies conditional expressions (1) and (2).

EXAMPLE 2

The following Table 2 shows the radius of curvature R (mm) of each lens surface, center thickness of each lens and air gap between neighboring lenses D (mm), and refractive index $N_e$, and Abbe number $\nu_e$ of each lens at e-line in Example 2.

Table 5 shows the values of individual constants C, K, $A_4$, $A_6$, $A_8$, and $A_{10}$ of the aspherical surfaces represented by the above-mentioned aspherical expressions in the imaging lens of Example 2.

Table 6 shows the values of focal length f, F number, imaging magnification β, and half angle of view ω of the whole lens system and values corresponding to the above-mentioned conditional expressions (1) and (2) in Example 2.

As can be seen from Table 6, Example 2 satisfies conditional expressions (1) and (2).

Figure 4:
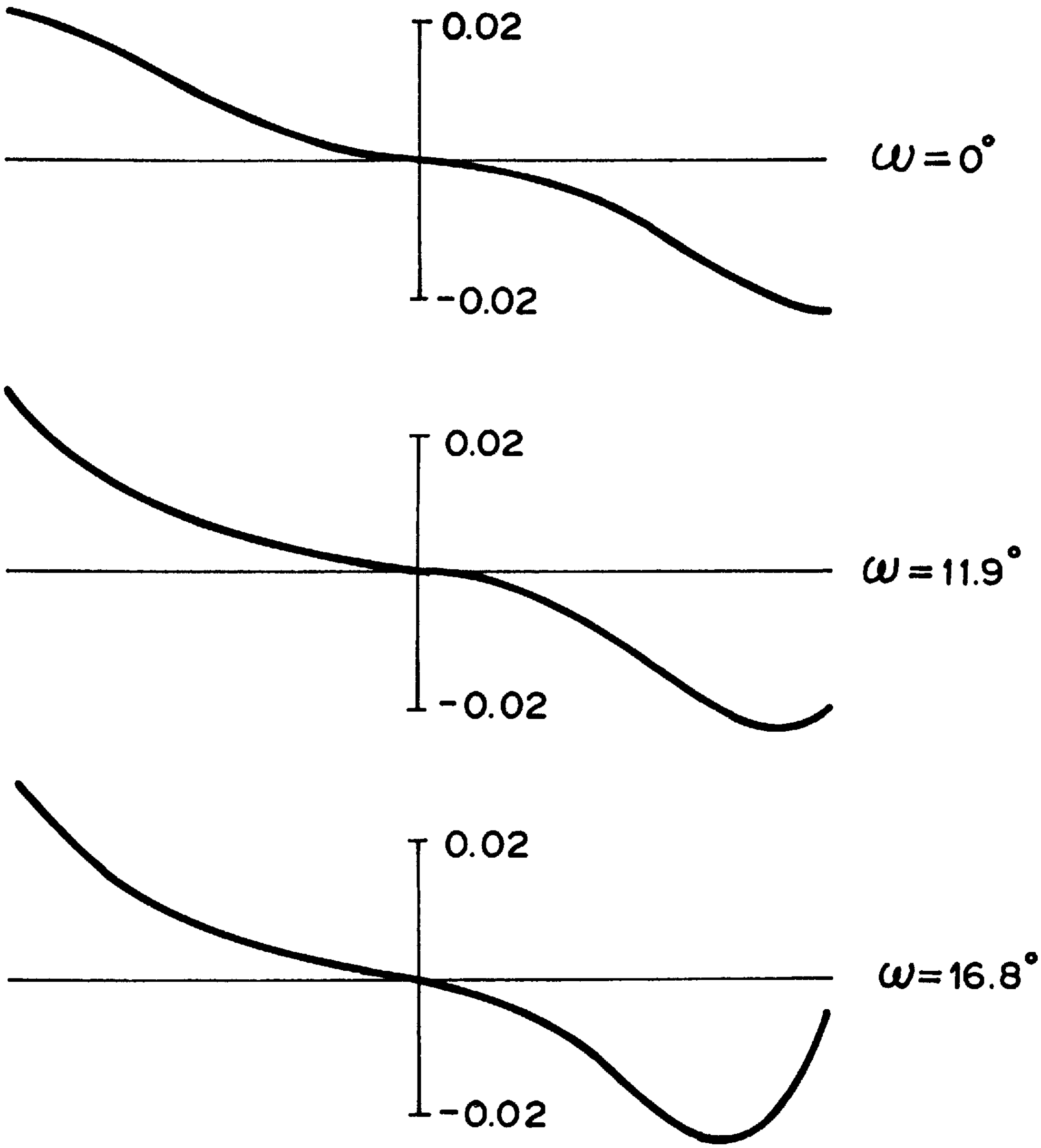
FIG. 4 is an aberration chart (for coma) of the imaging lens in accordance with Example 1.
Figure 5A:
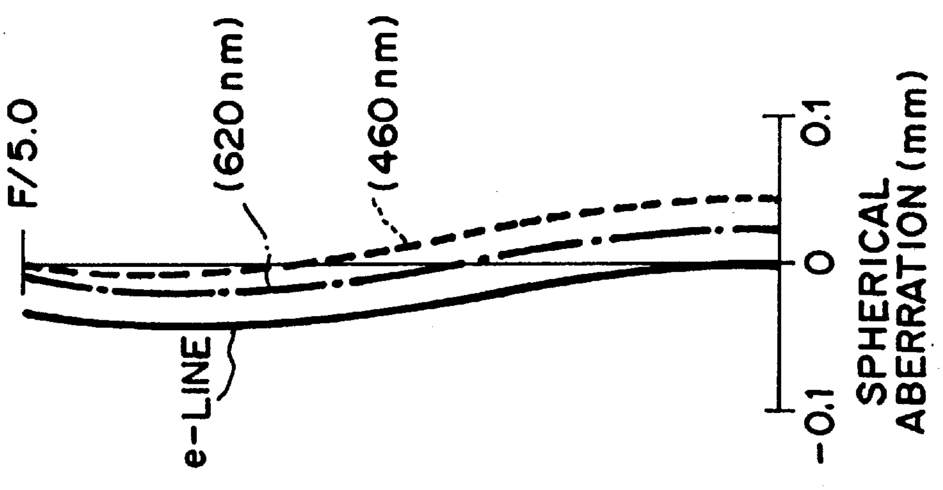
FIGS. 5A, 5B and 5C are aberration charts (for spherical aberration, astigmatism, and distortion) of the imaging lens in accordance with Example 2.
Figure 5B:
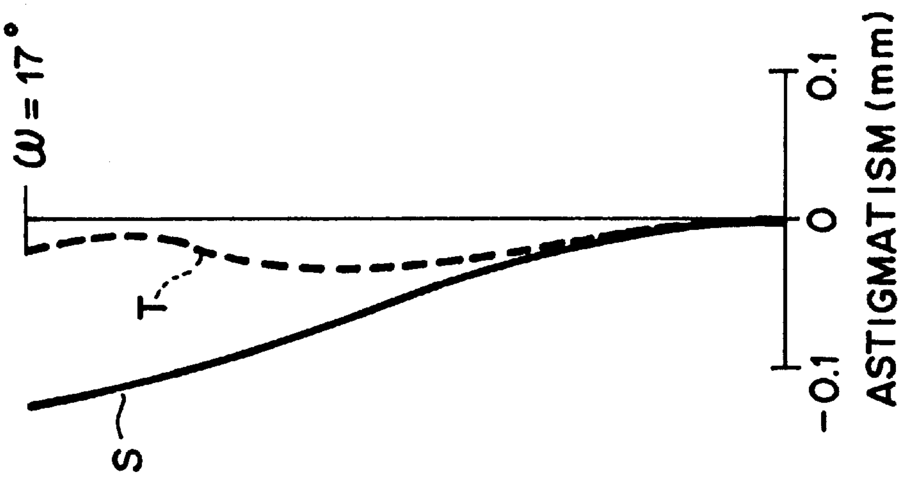
Figure 5C:
Figure 6:
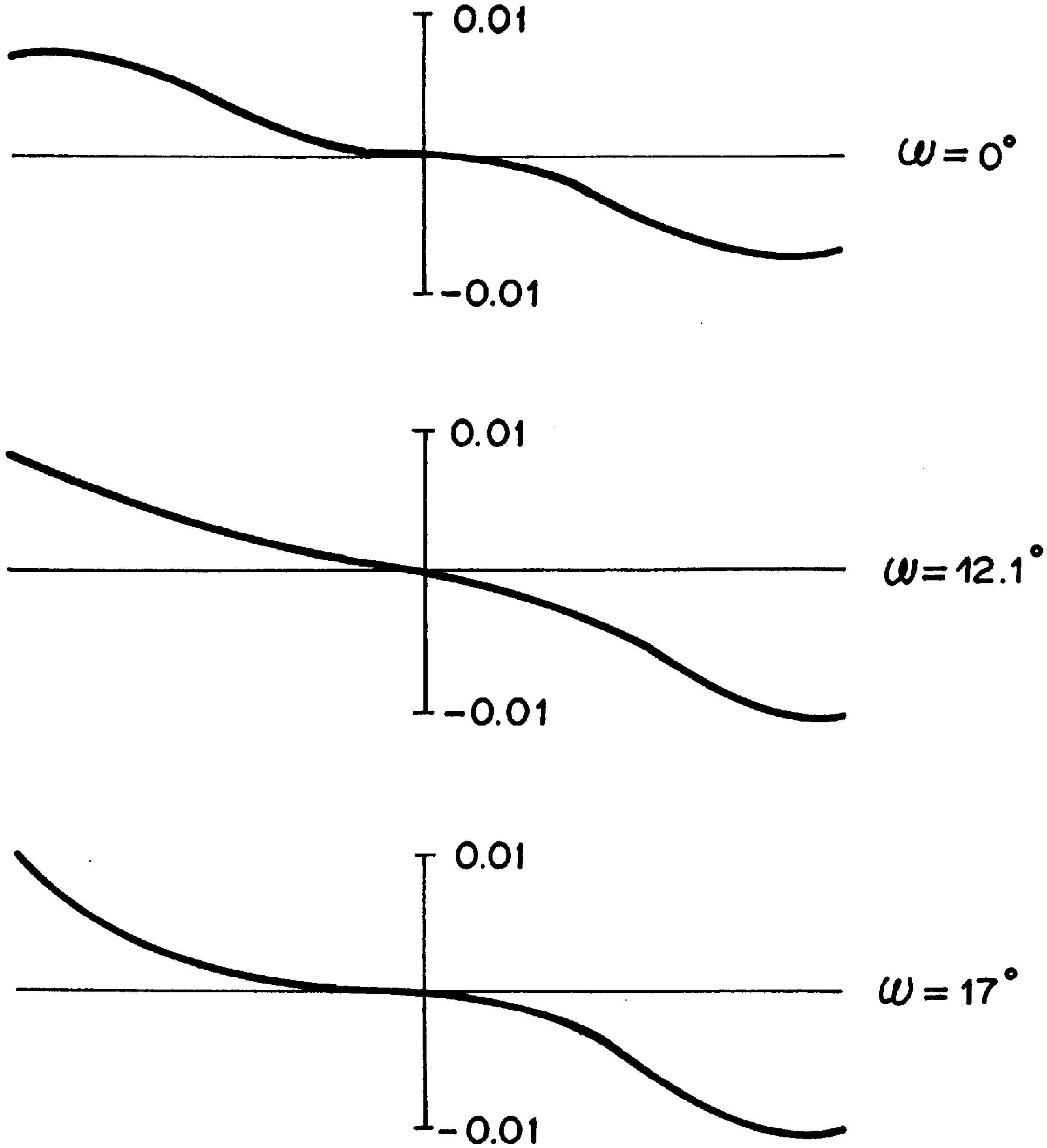
FIG. 6 is an aberration chart (for coma) of the imaging lens in accordance with Example 2.

FIGS. 3A, 3B, 3C, 5A, 5B and 5C are respective aberration charts (for spherical aberration, astigmatism, and distortion) of the imaging lenses in accordance with Examples 1 and 2, whereas FIGS. 4 and 6 are their respective coma aberration charts. In each aberration chart, ω indicates the half angle of view. Each spherical aberration chart shows respective aberrations at e-line, at a wavelength of 460 nm, and at a wavelength of 620 nm. Each astigmatism aberration chart shows respective aberrations with respect to sagittal (S) and tangential (T) image surfaces.

Each of the aberration charts shown in FIGS. 3 and 4 for the imaging lens in accordance with Example 1 indicates the state where glass plates (at a refractive index of 1.52) having thicknesses of 9.85 mm and 1.38 mm are inserted into the optical path on the object side and image side, respectively; whereas each of the aberration charts shown in FIGS. 5 and 6 for the imaging lens in accordance with Example 2 indicates the state where glass plates (at a refractive index of 1.52) having thicknesses of 9.72 mm and 1.36 mm are inserted into the optical path on the object side and image side, respectively.

As can be seen from FIGS. 3 to 6, each of the above-mentioned kinds of aberration can be made favorable in accordance with the above-mentioned Examples.

Without being restricted to the above-mentioned Examples, the imaging lens in accordance with the present invention can be modified in various manners. For example, the radius of curvature R and lens space (or lens thickness) D of each lens can appropriately be changed.

As explained in the foregoing, while being constituted by only four lens elements, since at least one surface of the fourth lens is made aspherical, the imaging lens in accordance with the present invention can achieve favorable optical performances on a par with those of conventional six-lens element Gaussian type or five-lens element Xenotar type lenses.

In particular, the imaging lens in accordance with the present invention can correct distortion to a higher degree than the conventional six-lens element Gaussian type or five-lens element Xenotar type lenses do. Therefore, when used as an original-reading lens in a copying apparatus which is required to read out originals finely, it can realize highly accurate copying.

Also, since it is constituted by four lens elements, the number of members can be reduced. As a result, a low-cost, light-weight imaging lens can be provided.

TABLE 1

Example 1

| Surface | | R | D | $N_e$ | $\nu_e$ |
|---|---|---|---|---|---|
| 1 | | 50.030 | 8.183 | 1.80560 | 30.1 |
| 2 | | 103.071 | 0.003 | | |
| 3 | | 29.692 | 11.267 | 1.80334 | 50.0 |
| 4 | | 110.176 | 0.671 | | |
| 5 | | 118.799 | 3.942 | 1.80674 | 24.9 |
| 6 | | 16.883 | 32.342 | | |
| 7 | * | −142.787 | 13.905 | 1.60629 | 63.0 |
| 8 | * | −35.167 | | | |

TABLE 2

Aspherical coefficient

| | 7th Surface | 8th Surface |
|---|---|---|
| C | $-7.003439 \times 10^{-3}$ | $-2.843575 \times 10^{-2}$ |
| K | 1.0 | 1.0 |
| $A_4$ | $-6.186418 \times 10^{-7}$ | $-2.958910 \times 10^{-7}$ |
| $A_6$ | $-2.911871 \times 10^{-10}$ | $-3.693302 \times 10^{-10}$ |
| $A_8$ | $-5.307506 \times 10^{-14}$ | $4.191468 \times 10^{-14}$ |
| $A_{10}$ | $-4.898579 \times 10^{-18}$ | $8.029101 \times 10^{-18}$ |

TABLE 3

Numerical data

| Item | Symbol | |
|---|---|---|
| Focal length | f | 100 |
| Brightness | FNO | 5.0 |
| Magnification | β | −0.11024 |
| Half angle of view | ω | 16.8° |
| Conditional expression (1) | $f_{123}$ | 270.8 |
| Conditional expression (2) | $f_4$ | 73.38 |

TABLE 4

Example 2

| Surface | | R | D | $N_e$ | $\nu_e$ |
|---|---|---|---|---|---|
| 1 | | 47.769 | 9.718 | 1.85555 | 32.4 |
| 2 | | 86.371 | 2.915 | | |
| 3 | | 29.635 | 11.661 | 1.85413 | 43.7 |
| 4 | | 76.339 | 0.967 | | |
| 5 | | 80.193 | 2.740 | 1.85136 | 22.8 |
| 6 | | 16.109 | 34.251 | | |
| 7 | * | −241.352 | 15.548 | 1.56054 | 66.0 |
| 8 | * | −31.706 | | | |

TABLE 5

Aspherical coefficient

| | 7th Surface | 8th Surface |
|---|---|---|
| C | $-4.143326 \times 10^{-3}$ | $-3.153977 \times 10^{-2}$ |
| K | 1.000420 | 7.297383 |
| $A_4$ | $6.352721 \times 10^{-9}$ | $7.780146 \times 10^{-9}$ |
| $A_6$ | $-1.346192 \times 10^{-10}$ | $1.064193 \times 10^{-10}$ |
| $A_8$ | $-4.937747 \times 10^{-14}$ | $8.590488 \times 10^{-14}$ |
| $A_{10}$ | $1.798630 \times 10^{-17}$ | $2.314242 \times 10^{-18}$ |

TABLE 6

Numerical data

| Item | Symbol | |
|---|---|---|
| Focal length | f | 100 |
| Brightness | FNO | 5.0 |
| Magnification | β | −0.11024 |
| Half angle of view | ω | 17° |
| Conditional expression (1) | $f_{123}$ | 394.5 |
| Conditional expression (2) | $f_4$ | 63.43 |

What is claimed is:

1. An imaging lens comprising, successively from an object side, positive first and second lenses each having a surface on the object side convex toward the object side, a negative third lens having a surface on an image side concave toward the image side, and a positive fourth lens having at least one aspheric surface, and wherein a stop is disposed between said third and fourth lenses.

2. An imaging lens comprising, successively from an object side, positive first and second lenses each having a surface on the object side convex toward the object side, a negative third lens having a surface on an image side concave toward the image side, and a positive fourth lens having at least one aspheric surface, satisfying the following conditional expressions (1) and (2):

(1) $f_{123}>f$ (2) $f>f_4$ where f is the composite focal length of the whole lens system near the optical axis thereof;

$f_{123}$ is the composite focal length of the first, second, and third lenses; and $f_4$ is the focal length of the fourth lens near the optical axis thereof.

3. An imaging lens comprising, successively from an object side, positive first and second lenses each having a surface on the object side convex toward the object side, a negative third lens having a surface on an image side concave toward the image side, and a positive fourth lens having at least one aspheric surface;

wherein a stop is disposed between said third and fourth lenses, satisfying the following conditional expression:

$f_{123}>f$ where f is the composite focal length of the whole lens system near the optical axis thereof; and $f_{123}$ is the composite focal length of the first, second, and third lenses.

4. An imaging lens comprising, successively from an object side, positive first and second lenses each having a surface on the object side convex toward the object side, a negative third lens having a surface on an image side concave toward the image side, and a positive fourth lens having at least one aspheric surface;

wherein a stop is disposed between said third and fourth lenses, satisfying the following conditional expression:

$f>f_4$ where f is the composite focal length of the whole lens system near the optical axis thereof; and $f_4$ is the focal length of the fourth lens near the optical axis thereof.

5. An optical apparatus employing the imaging lens according to claim 1.

6. An optical apparatus employing the imaging lens according to claim 3.

7. An optical apparatus employing the imaging lens according to claim 4.

8. An optical apparatus employing the imaging lens according to claim 2.

* * * * *